United States Patent
Fader et al.

(10) Patent No.: US 7,992,280 B2
(45) Date of Patent: Aug. 9, 2011

(54) METHOD OF CASTING METAL ANTI-SHIFT COLLARS FOR STABILIZER BAR

(75) Inventors: Joseph A. Fader, Brighton, MI (US); Leo Medeiros, Guelph (CA)

(73) Assignee: MSSC US, Troy, MI (US)

( * ) Notice: Subject to any disclaimer, the term of this patent is extended or adjusted under 35 U.S.C. 154(b) by 0 days.

(21) Appl. No.: 11/970,064

(22) Filed: Jan. 7, 2008

(65) Prior Publication Data

US 2009/0174165 A1 Jul. 9, 2009

(51) Int. Cl.
*B23P 17/00* (2006.01)
*B22D 25/00* (2006.01)
*B60G 21/055* (2006.01)

(52) U.S. Cl. ........ 29/527.1; 29/527.5; 164/464; 280/124.152; 267/188

(58) Field of Classification Search .................. 29/527.1, 29/527.2, 527.3, 527.5; 164/464, 91; 280/124.152; 267/188
See application file for complete search history.

(56) References Cited

U.S. PATENT DOCUMENTS

| 5,145,273 | A | 9/1992 | Hellon | |
|---|---|---|---|---|
| 5,352,055 | A | 10/1994 | Hellon | |
| 2003/0175073 | A1 | 9/2003 | Funke | |
| 2005/0127633 | A1* | 6/2005 | Fader et al. | 280/124.106 |
| 2006/0082093 | A1 | 4/2006 | Sterly | |
| 2007/0085295 | A1 | 4/2007 | Johnson | |
| 2008/0111335 | A1* | 5/2008 | DiNello | 280/124.106 |
| 2008/0211202 | A1* | 9/2008 | Belding et al. | 280/124.107 |

FOREIGN PATENT DOCUMENTS

| DE | 3921457 | 1/1991 |
|---|---|---|
| GB | 2419653 | 5/2006 |
| JP | 59013147 | 7/1982 |
| JP | 59013148 | 7/1982 |
| JP | 1030937 | 7/1987 |
| JP | 1182767 | 11/1988 |
| JP | 2003237338 | 8/2003 |
| JP | 59013146 | 1/2008 |
| WO | 2006127707 | 11/2006 |
| WO | 2007047051 | 4/2007 |

* cited by examiner

*Primary Examiner* — Jermie E Cozart
(74) *Attorney, Agent, or Firm* — Carlson, Gaskey & Olds, P.C.

(57) ABSTRACT

A method of processing a stabilizer bar assembly includes casting a metal anti-shift collar onto a prefabricated stabilizer bar. The metal anti-shift collar may be a zinc alloy, an aluminum alloy, or a magnesium alloy, for example.

11 Claims, 2 Drawing Sheets

METHOD OF CASTING METAL ANTI-SHIFT COLLARS FOR STABILIZER BAR

BACKGROUND OF THE INVENTION

A stabilizer bar is used in a vehicle suspension to improve stability and handling characteristics as a vehicle experiences suspension loading. The stabilizer bar extends in a lateral direction between opposed wheel ends and typically connects suspension elements mounted on an axle at one wheel end to suspension elements on the axle at an opposite wheel end. Bushings are used to mount a central portion of the stabilizer bar to a vehicle structure, such as a vehicle frame.

Under certain conditions, the stabilizer bar can move in an axial direction relative to these bushings. This is often referred to as "walking." In the past, anti-walk features have been incorporated onto the stabilizer bar to prevent this phenomenon. Known anti-walk features are often difficult to assemble onto the stabilizer bar and may be prone to dislodging from the stabilizer bar.

SUMMARY OF THE INVENTION

The disclosed examples teach forming an anti-shift collar on a stabilizer bar such that the anti-shift collar is strongly secured to the stabilizer bar.

In one example method, a metal anti-shift collar is cast onto a prefabricated stabilizer bar. The method may be used to manufacture a stabilizer bar assembly wherein the stabilizer bar is fabricated from a first metal material and the metal anti-shift collar is fabricated from a second material having a lower melting temperature than the first metal material.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
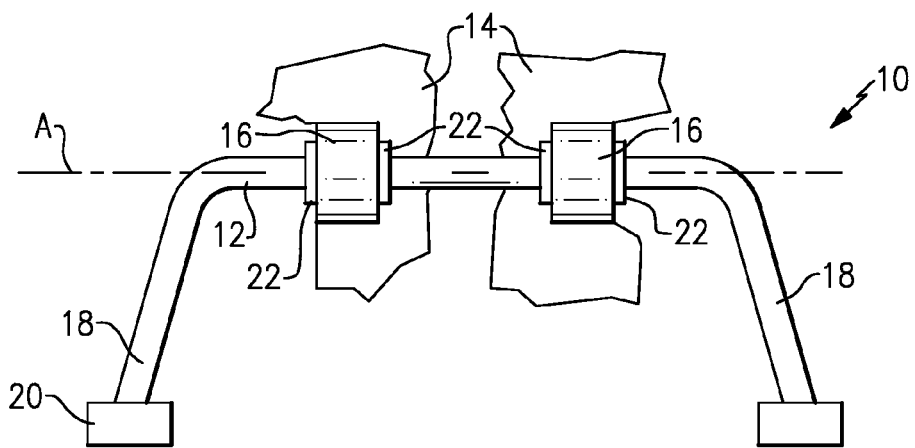
FIG. 1 illustrates a schematic view of a vehicle suspension having a cast metal anti-shift collar.

FIG. 1 illustrates an example suspension assembly 10 that includes a stabilizer bar 12 that is securable to a vehicle structure 14 having bushings 16. In this example, two bushings 16 are shown; however, a single bushing 16 or a greater number of bushings 16 could also be utilized. The stabilizer bar 12 generally extends in a lateral direction along an axis A between laterally opposed vehicle wheels (not shown) and includes opposing ends 18 that are securable to laterally opposed suspension components 20. For example, the suspension components 20 are left-side and right-side control arms. It is to be understood that while the stabilizer bar 12 is generally shown with a particular configuration, the stabilizer bar 12 may include bends and/or angled portions depending upon the desired suspension configuration and vehicle application.

At least one metal anti-shift collar 22 is secured to the stabilizer bar 12 adjacent to one lateral side of each bushing 16. The bushings 16 are typically made from a resilient material (e.g., rubber), although other types of materials may also be used for the bushings 16. The metal anti-shift collars 22 facilitate preventing relative lateral movement between the bushings 16 and the stabilizer bar 12 in a direction along the axis A. That is, the metal anti-shift collars 22 limit the phenomenon of "walking." Alternatively, a single anti-shift collar 22 may be used inside bushing 16 to limit lateral movement of the stabilizer bar 12.

As will now be described, the metal anti-shift collars 22 and stabilizer bar 12 may have various design shapes or be formed from various different materials. Given this description, one of ordinary skill in the art will be able to recognize other shapes and materials that suit their particular needs.

Figure 2:
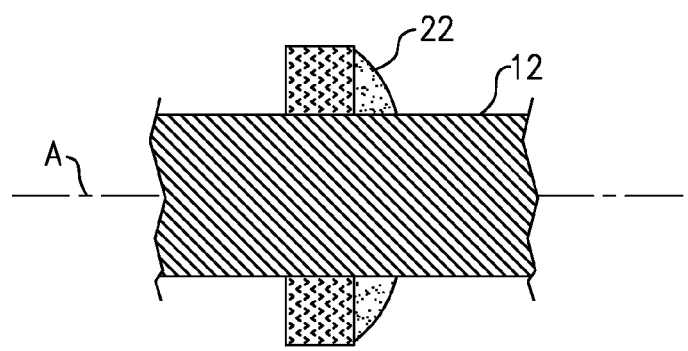
FIG. 2 illustrates a cross-section of a stabilizer bar and cast metal anti-shift collar of FIG. 1.

FIG. 2 illustrates a cross-section of the stabilizer bar 12 and one of the metal anti-shift collars 22 from FIG. 1. In this example, the stabilizer bar 12 is a solid rod that is fabricated in a known manner from a steel material. Other materials may alternatively be used for the stabilizer bar 12.

The metal anti-shift collar 22 is generally in the shape of an annular ring that extends around the outer periphery of the stabilizer bar 12 (e.g., circumference if the stabilizer bar 12 has a circular cross-section). As can be appreciated, the metal anti-shift collar 22 may be designed to have a different shape than shown. For example, it may be desirable for the metal anti-shift collar 22 to be axially thicker/thinner than shown to achieve a desired strength, or radially taller/shorter than shown to avoid interference with the neighboring component.

Figure 3:
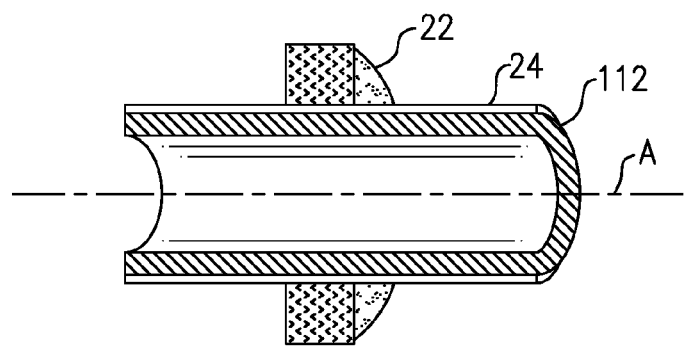
FIG. 3 illustrates another example of a stabilizer bar and cast metal anti-shift collar.

Referring to FIG. 3, another example stabilizer bar 112 is shown and may be used in place of a stabilizer bar 12 of the previous examples. The stabilizer bar 112 is a hollow tube that is fabricated from a steel material. The metal anti-shift collar 22 extends around the outer periphery of the stabilizer bar 112, similar to the previous example.

Optionally, the outer surface of the stabilizer bar 112 may be coated with a layer of paint 24 to protect the stabilizer bar 112 from corrosion, for example. Likewise, the stabilizer bar 12 of the previous example may also include the layer of paint 24. The metal anti-shift collar 22 is formed around the layer of paint 24 and the stabilizer bar 112. That is, the layer of paint 24 is between the radially inner surface of the metal anti-shift collar 22 and the radially outer surface of the stabilizer bar 112 relative to axis A. Thus, use of the metal anti-shift collar 22 does not preclude using the layer of paint 24 for corrosion protection, nor does the metal anti-shift collar 22 necessitate forming a discontinuity in the layer of paint 24.

The metal anti-shift collar 22 may be formed from any of a variety of different materials. For example, the metal anti-shift collar 22 includes at least one of a zinc alloy, an aluminum alloy, or a magnesium alloy. As can be appreciated, other types of metals or metal alloys may alternatively be used. Using the zinc alloy, the aluminum alloy, or the magnesium alloy provides the metal anti-shift collar 22 with a relatively high strength and relatively low weight. Thus, the metal anti-shift collar 22 may be stronger than previously known plastic collars but does not contribute significantly to the mass of the suspension assembly 10, as would a steel collar.

Using the zinc alloy, the aluminum alloy, or the magnesium alloy also facilitates manufacturing of the metal anti-shift collar 22. For example, the metal anti-shift collar 22 is formed on the stabilizer bar 12 or 112 using a casting process. That is, the stabilizer bar 12 or 112 is prefabricated and the metal anti-shift collar 22 is formed directly onto the outer surface of the stabilizer bar 12 or 112.

The alloy selected for the metal anti-shift collar 22 may have a lower melting point than the alloy selected for the stabilizer bar 12 or 112 to avoid diminishing the properties of the stabilizer bar 12 or 112. During the casting process, the alloy that is to be used for forming the metal anti-shift collar 22 is melted and cast around the stabilizer bar 12 or 112 without melting and/or thermally damaging the stabilizer bar 12 or 112. For example, the temperature of the melted alloy used for the anti-shift collar 22 does not significantly alter the metallic microstructure of the stabilizer bar 12 or 112, nor does the melting temperature negate prior treatments that may have been used to strengthen the stabilizer bar 12 or 112.

Certain alloys selected for the anti-shift collar 22 may provide a relatively greater buffer from negatively influencing the stabilizer bar 12 or 112. For example, the zinc alloy (having the lowest melting temperature of the three given example alloys) freezes from the molten state in a shorter amount of time than the aluminum alloy or the magnesium alloy. Therefore, for the zinc alloy, the casting cycle times can be relatively short and the casting temperature can be relatively low, which provides a relatively large buffer from the time/temperatures that would negatively influence the stabilizer bar 12 or 112. The aluminum alloy and the magnesium alloy also provide a buffer; however, the buffer may not be as large because longer cycle times may be necessary to freeze and cool these higher melting-temperature alloys.

Figure 4:
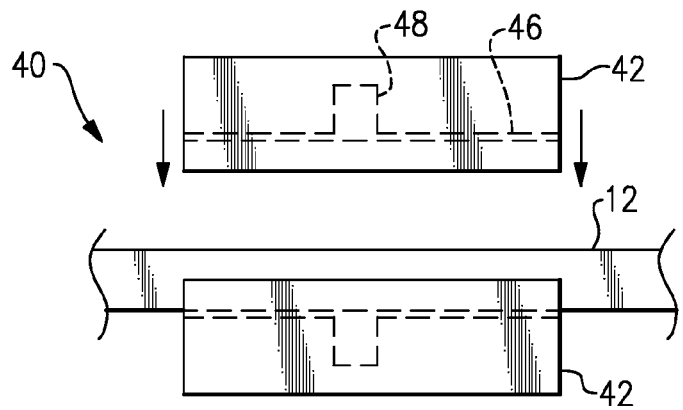
FIG. 4 illustrates a portion of a casting method used to form a metal anti-shift collar.
Figure 6:
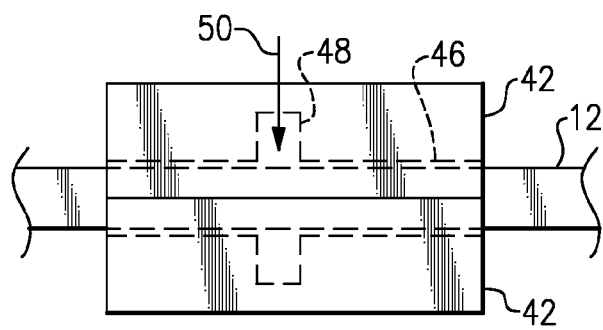
FIG. 6 illustrates a continuation of the casting method of FIG. 4.
Figure 5:
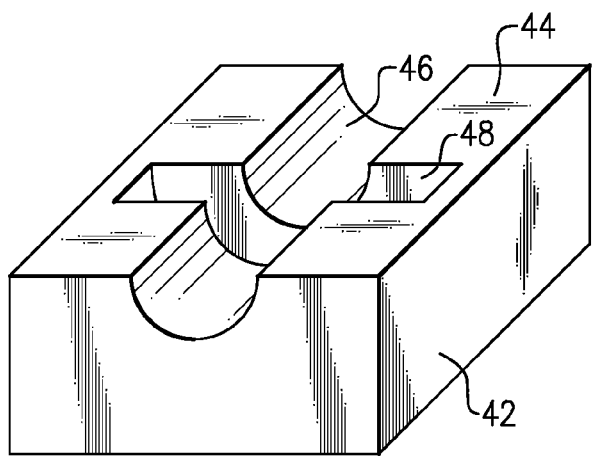
FIG. 5 illustrates a casting die used in the method of FIG. 4 for forming the metal anti-shift collar.

FIG. 4 illustrates one example casting process 40 for forming the metal anti-shift collar 22 as in the previous examples. In this example, the stabilizer bar 12 (solid rod) is shown; however, it is to be understood that the stabilizer bar 112 (hollow tube) could be substituted for the stabilizer bar 12. In the illustrated example, the stabilizer bar 12 is located between two casting dies 42. As also shown in FIG. 5, each of the casting dies 42 includes a mating surface 44 that closes against the mating surface 44 of the opposing casting die 42. A semi-circular groove 46 runs along the length of the casting die 42 for receiving the stabilizer bar 12. In this regard, the semi-circular groove 46 corresponds to the circular cross-sectional shape of the stabilizer bar 12. A semi-annular cavity 48 extends generally perpendicularly from the semi-circular groove 46 such that when the casting dies 42 are closed together, the semi-annular cavities 48 form an annular cavity around the semi-circular grooves 46 (which together form a cylindrical groove). As can also be appreciated, the casting dies 42 may include additional semi-annular cavities 48 for casting more than one metal anti-shift collar 22 on the stabilizer bar 12.

The stabilizer bar 12 is located within the semi-circular groove 46 of one of the casting dies 42, such as a lower one of the casting dies 42. The other casting die 42, such as an upper one of the casting dies 42, is then closed around the stabilizer bar 12 such that the stabilizer bar 12 is clamped within the semi-circular grooves 46. In one example, the shape of the semi-circular grooves 46 may relatively precisely match the shape of the stabilizer bar 12 such that the stabilizer bar 12 tightly fits within the semi-circular grooves 46 to prevent flashing of molten alloy from the semi-annular cavities 48. In other examples, seals may be used within the semi-circular grooves 46 near the semi-annular cavities 48 to prevent flashing of molten alloy along the semi-circular grooves 46 during the casting process.

After closing the casting dies 42, molten alloy material 50 is injected into the semi-annular cavities 48. The molten alloy material flows through the semi-annular cavities 48 and around the stabilizer bar 12. The casting dies 42 may include internal cooling passages for circulating a coolant, such as water, to facilitate uniform solidification of the molten alloy material 50. After solidification, the casting dies 42 are opened, and the stabilizer bar and metal anti-shift collar 22 are removed from the casting dies 42.

As the molten alloy material 50 solidifies into the solid metal anti-shift collar 22, the alloy material shrinks and the metal anti-shift collar 22 tightens around the stabilizer bar 12. For example, use of the zinc alloy, the aluminum alloy, or the magnesium facilitates shrinking and thereby secures the metal anti-shift collar 22 on the stabilizer bar 12. Thus, forming the metal anti-shift collar 22 using the casting process 40 described herein may eliminate the need for using fasteners, adhesives, or secondary processes such as welding to attach a collar to a stabilizer bar. Furthermore, the metal anti-shift collar 22 is itself strong and is securely fastened on the stabilizer bar 12 by the casting process. Thus, the metal anti-shift collars 22 is unlikely to break or loosen from the stabilizer bar 12, as may be experienced with some prior collars. Additionally, the anti-shift collar or collars 22 may be formed with relatively little variation from design dimensions compared to crimped collars or upset collars, for example, which may vary from the design shape or exhibit die flashing/bar swelling (in the case of upset collars) that may cause performance variation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of processing a stabilizer bar assembly, comprising:
   casting a first metal anti-shift collar onto a prefabricated stabilizer bar, wherein the first metal anti-shift collar has a uniform diameter between terminal ends and includes a first collar surface for contacting a first bushing; and
   casting a second metal anti-shift collar having a second collar surface for contacting the first bushing onto the prefabricated stabilizer bar.

2. The method as recited in claim 1, including casting a zinc alloy as the first and second metal anti-shift collar.

3. The method as recited in claim 1, including casting an aluminum alloy as the first and second metal anti-shift collar.

4. The method as recited in claim 1, including casting a magnesium alloy as the first and second metal anti-shift collar.

5. The method as recited in claim 1, including casting the first and second metal anti-shift collar in an annular shape.

6. The method as recited in claim 1, including casting the first and second metal anti-shift collar onto a painted surface of the prefabricated stabilizer bar.

7. The method as recited in claim 1, wherein the casting includes injecting molten metal into a cavity having a shape corresponding to at least one the metal anti-shift collars, solidifying the molten metal into at least one the metal anti-shift collars, and cooling the at least one metal anti-shift collar to cause shrinkage of the at least one metal anti-shift collar around the prefabricated stabilizer bar.

8. The method as recited in claim 1, wherein the casting includes locating a section of the prefabricated stabilizer bar in a casting die having a cavity with a shape that corresponds to at least one of the metal anti-shift collars, closing the casting die around the section of the prefabricated stabilizer bar, and injecting a molten metal into the cavity.

9. The method as recited in claim 1, wherein the terminal ends of the metal first anti-shift collar are axially opposing.

10. A method of processing a stabilizer bar assembly, comprising:

casting a first metal anti-shift collar and a second metal anti-shift collar onto a stabilizer bar, wherein the first metal anti-shift collar includes a first collar surface oriented to contact a first bushing and the second metal anti-shift collar includes a second collar surface oriented for contacting the first bushing.

11. The method as recited in claim 10, wherein the first metal anti-shift collar is symmetric about a plane perpendicular to an axis of the stabilizer bar.

\* \* \* \* \*